United States Patent
Lerzer et al.

(10) Patent No.: US 10,206,177 B2
(45) Date of Patent: Feb. 12, 2019

(54) MANAGING A POWER CONSUMPTION OF A MOBILE COMMUNICATION DEVICE

(75) Inventors: Jürgen Lerzer, Neumarkt (DE); Stefan Meyer, Hoechstadt (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 173 days.

(21) Appl. No.: 13/318,732

(22) PCT Filed: Dec. 4, 2009

(86) PCT No.: PCT/EP2009/066443
§ 371 (c)(1),
(2), (4) Date: Jan. 6, 2012

(87) PCT Pub. No.: WO2010/127725
PCT Pub. Date: Nov. 11, 2010

(65) Prior Publication Data
US 2012/0135696 A1    May 31, 2012

Related U.S. Application Data

(60) Provisional application No. 61/176,259, filed on May 7, 2009, provisional application No. 61/176,556, filed on May 8, 2009.

(51) Int. Cl.
*H02J 7/34* (2006.01)
*H04W 52/02* (2009.01)

(52) U.S. Cl.
CPC ... *H04W 52/0296* (2013.01); *H04W 52/0277* (2013.01); *H02J 7/345* (2013.01); *Y02D 70/00* (2018.01); *Y02D 70/1224* (2018.01); *Y02D 70/1242* (2018.01); *Y02D 70/1244* (2018.01); *Y02D 70/1246* (2018.01); *Y02D 70/1262* (2018.01); *Y02D 70/168* (2018.01)

(58) Field of Classification Search
CPC ......... H04W 52/0251; H04W 52/0206; H04W 52/02; H04W 52/0209; H04W 52/0216; H04W 52/0254; H04W 52/0296; Y02B 60/50; H02J 7/345
USPC .............................................. 455/127.5, 574
See application file for complete search history.

(56) References Cited

U.S. PATENT DOCUMENTS

| | | | |
|---|---|---|---|
| 6,064,857 A | 5/2000 | Wiedeman et al. | |
| 6,078,167 A | 6/2000 | Oskowsky et al. | |
| 6,256,517 B1 * | 7/2001 | Watanabe | H04M 1/73 455/464 |

(Continued)

FOREIGN PATENT DOCUMENTS

| | | |
|---|---|---|
| CN | 1411638 A | 4/2003 |
| CN | 1520072 A | 8/2004 |

(Continued)

*Primary Examiner* — Andrew Wendell
*Assistant Examiner* — Maryam Soltanzadeh
(74) *Attorney, Agent, or Firm* — Coats & Bennett, PLLC

(57) ABSTRACT

The invention relates to managing a power consumption of a mobile communication device being capable of transmitting transmission data at a transmission data rate towards a communication network. The method comprises reducing (101) a transmission data rate within a certain transmission time interval to reduce an energy consumption of the mobile communication device by a certain amount of energy, and storing (103) the certain amount of energy.

19 Claims, 10 Drawing Sheets

(56) References Cited

U.S. PATENT DOCUMENTS

| | | |
|---|---|---|
| 6,760,311 B1 | 7/2004 | Raith |
| 6,898,438 B1 | 5/2005 | Uchida |
| 6,944,469 B2 | 9/2005 | Jo et al. |
| 7,554,218 B2 * | 6/2009 | DuBose et al. ............. 307/10.1 |
| 8,155,712 B2 * | 4/2012 | Gilb ........................ H01Q 3/26 |
| | | 455/127.5 |
| 2002/0036994 A1 | 3/2002 | Huh et al. |
| 2004/0150369 A1 * | 8/2004 | Deniau ................ H02J 7/0029 |
| | | 320/136 |
| 2004/0155635 A1 | 8/2004 | Sasaki |
| 2004/0204181 A1 | 10/2004 | Cromer et al. |
| 2006/0120404 A1 * | 6/2006 | Sebire ................... H04L 1/1812 |
| | | 370/469 |
| 2008/0279264 A1 * | 11/2008 | Desai ................... H04W 16/14 |
| | | 375/220 |
| 2010/0216524 A1 * | 8/2010 | Thomas ............ H04W 52/0264 |
| | | 455/574 |
| 2013/0301533 A1 * | 11/2013 | Oteri et al. .................. 370/328 |

FOREIGN PATENT DOCUMENTS

| | | |
|---|---|---|
| EP | 1292040 A2 | 3/2003 |
| EP | 1445780 A1 | 8/2004 |
| EP | 1536569 A1 | 6/2005 |
| EP | 1594232 A1 | 11/2005 |
| GB | 2309360 A | 7/1997 |
| RU | 2249302 C2 | 3/2005 |
| RU | 2251800 C2 | 5/2005 |

\* cited by examiner

A)

B)

MANAGING A POWER CONSUMPTION OF A MOBILE COMMUNICATION DEVICE

BACKGROUND OF THE INVENTION

The present invention relates to mobile communications, and particularly to mobile terminal power management.

Emerging communication technologies such as E-UTRA (Evolved Universal Terrestrial Radio Access) or UTRA (Universal Terrestrial Radio Access) are designed to support mobile communications upon the basis of mobile user equipment (UE), e.g. mobile terminals or handset devices. In this regard, the development of UE devices such as mobile terminals or hand sets for communicating over radio communication networks is subject to improvements reflecting certain technology trends. One technology trend is to reduce weight and size of the UE which results in a need for smaller energy sources, e.g. batteries. Another technology trend is to provide more and smarter functions within the UE which is often associated with an increased consumption of electrical power. Even though the energy source development has brought increasingly powerful batteries, the UE power consumption is a critical parameter especially with regard to high data rate UEs which, by way of example, are suitable for WCDMA (Wide Band Code Division Multiple Access) and E-UTRA radio access networks. The energy consumption is further affected by thermal energy dissipation may be an important aspect with respect to power consumption in future UE technologies.

In the following, by way of example and without limiting the invention, technological background, problems and solutions with respect to power consumption are described by focusing on the LTE technology.

Initiated in recent years, the LTE project focuses on enhancing the Universal Terrestrial Radio Access (UTRA) and optimizing 3GPP's radio access architecture. Targets have been set providing an average user throughput of three- to four-times the Release 6 HSPA (High Speed Packet Access) levels in the Downlink-HSDPA-(100 Mbps), and two to three times the HSPA levels in the Uplink-HSUPA- (50 Mbps). Orthogonal Frequency Division Multiplexing (OFDM) has been selected for the Downlink and Single Carrier-Frequency Division Multiple Access (SC-FDMA) for the Uplink. The Downlink will support data modulation schemes QPSK, 16QAM, and 64QAM and the Uplink will support BPSK, QPSK, 8PSK and 16QAM. LTE's E-UTRA is designed to be flexible using a number of defined channel bandwidths between 1.25 and 20 MHz (in contrast to the UTRA's fixed 5 MHz channels).

The uplink (UL) transmission of the LTE system is usually performed with a 1 ms granularity, i.e. the UL transmission time interval (TTI) for LTE is 1 ms. The UE receives the information in frame x about the amount of data to be send in frame x+4. Before the actual transmission the UE creates the uplink data blocks and sends them out at frame x+4 with the indicated transmission power.

In order to implement UE devices employing the LTE technology, a mobile platform architecture enabling an integration of the LTE technology into future mobile phones, data cards and other devices requiring wireless connectivity based on high data rates like e.g. cameras, PDAs (Personal Digital System), TVs (Television) etc. may be chosen. In this regard, the power consumption of corresponding UEs may be subject to certain power consumption limits and restrictions which are, by way of example, summarized in the following table for a UE being implemented into a PCIe (Peripheral Component Interconnect Express) mini card.

| | PCIe Mini Card | Notes |
|---|---|---|
| 3.3 V Tolerance | ±0.3 V | |
| 3.3 V Average Current | 1100 mA | Averaged over any 1 second interval |
| 3.3 V Maximum Current | 2750 mA | Averaged over 100 µSec for PCIe. |
| 1.5 V Tolerance | ±0.075 V | |
| 1.5 V Average Current | 375 mA | |
| 1.5 V Max Current | 500 mA | |
| Allowed total heat dissipation for class 1 devices | 2.3 W | When all components are rated for a case temperature of 90 C. |
| Allowed total heat dissipation for class 2 devices | 3.1 W | |

For a deployment in a USB dongle/stick the 5V (Tolerance: ±0.25V) Average and Maximum Current per USB port is 500 mA. There is no restriction concerning the allowed heat dissipation. I.e. in case a USB dongle has 1 USB port it can consume maximum 2.5 W, in case it has 2 USB ports it can consume up to 5W. The above listed values can be taken as limits for a mobile phone platform when deployed in a single-mode device. In case of a deployment in a multi-mode device the power consumption of other devices has to be taken in account, which leads to a further reduction of the maximum allowed limits.

In this regard, the U.S. Pat. No. 6,760,311 discloses a mobile terminal, wherein certain operating parameters, such as the transmission data rate, are controlled such that a certain temperature threshold is not exceeded. The U.S. Pat. No. 6,064,857 discloses a satellite telephone with hybrid battery and capacitor power supply comprising a switching circuit coupled to said battery and said capacitor for selectively coupling one of (a) the battery alone, (b) the capacitor alone, and (c) both together in parallel to the transmitter, depending on the data rate.

SUMMARY

It is the object of the present invention to provide a concept for efficiently managing a power consumption of a mobile communication device. This object is achieved by the features of the independent claims. Further embodiments are apparent from the dependent claims, the description and the accompanying drawings.

The invention is based on the insight that an efficient concept for managing a power consumption of a mobile communication device may be achieved by reducing an energy consumption of the mobile communication device within certain transmission time intervals and by (temporary) saving the non-consumed amount of energy provided from the device's power supply in a suitable energy storage or buffer. The stored energy may be provided during further transmission time intervals in order to additionally energize the mobile communication device, in particular if the regular power supply limits the energy or power available for the radio circuit of the mobile communication device. In the following, the terms "mobile communication device" and UE are used synonymously. The management of the power consumption may comprise limiting the power or energy consumption. In particular, the term "energy" may relate to electrical energy and the term "power" may relate to electrical power.

According to embodiments of the invention, a method is proposed to limit a power (current) consumption of an embedded mobile communication system, in particular of an LTE or WCDMA UE, by controlling or manipulating the UL transmission on an interface towards the corresponding communications network.

In an embodiment, the controlling or manipulating is performed in dependence of the UE power consumption (e.g. the power actually being consumed, to be consumed, or forecasted to be consumed) and the available power (e.g. dependent of capabilities of the power supply (e.g. the battery) and/or of a further energy storage (e.g. a capacitor circuit and/or a further battery).

In an embodiment, the UL transmission is controlled to ensure that one or a plurality of defined (environmental) conditions/limits (e.g. a current/power consumption limit, an average current/power consumption limit, a peak current/power consumption limit) is fulfilled.

In an embodiment, the UL transmission is controlled by reducing the amount of UL data (wherein the term reducing covers reduction to any number, e.g. to zero data) within certain transmission intervals (in the following also being referred to as inserting a transmission gap).

In an embodiment, the reduction is performed by suppressing a transmission of (parts of the) data to be transmitted within the transmission interval and delaying the transmission of the data accordingly.

In an embodiment, the transmission of one of a plurality of channels (e.g. the use channel) is suppressed while a transmission of data over the other channels (e.g. the control channel) is not altered.

In an embodiment, the transmission interval is an LTE uplink transmission time interval (TTI), wherein the reduction of data is realized by reducing the resource blocks associated to this TTI.

In an embodiment, the reduction is achieved by at least one of: manipulating the received UL resource allocation transmitted by the network before delivery to Layer 2 (MAC layer), disabling the reception of the UL resource allocation transmitted by the network on the physical layer (PHY), and cancellation of the UL transmission on the PHY.

In an embodiment, one or a plurality of transmission gaps are inserted within the UL data signal, depending on a UE power consumption (e.g. being measured, calculated, estimated or forecasted) and at least one of: a power limit, an average power limit, a temperature limit, a UE capability limit related to power supply, and a UE power supply capability limit.

In an embodiment, one or a plurality of UL transmission gaps are inserted to ensure both an average current limitation and a peak current limitation.

In an embodiment, an energy storage (e.g. battery or capacitor) is provided to store energy from the (main) power supply of the UE during transmission gaps, and to provide to the UE (e.g. the network interface) additional power in addition to the power from the power supply in other transmission periods (this can e.g. be advantageously applied in situations of a current limitation, wherein the current limit for one TTI is below the (maximum) needed current in one TTI)

In an embodiment, a power management distribution of the current to be consumed to the different building blocks of the embedded system is performed.

In an embodiment, a power supply capability detection is performed to detect capabilities of the host power supply (e.g. comprising a static part being derived from known system parameters or being detected in advance, e.g. at the start-up phase, and/or comprising a dynamic part of the host power supply capabilities which may vary over the time and is determined during UE operation (e.g. continuously or repeatedly to be measured, detected or estimated).

In an embodiment, an energy consumption forecast calculation is performed to determine an expected energy (or power) consumption of the embedded system for the next TTI(s) and optionally estimates a forecast of the expected energy consumption for the following TTIs (n+1, n+2, . . . ) from parameters provided from the network (by the network interface), e.g. the used bandwidth, the scheduled UL transmission power and the scheduled UL and DL data rates.

In an embodiment, an environmental conditions dependent UL transmission manipulation is performed by deciding dependent on the available energy for the next TTI(s) and on the expected energy consumption for the next TTI(s), whether and where (in which TTI(s)) the UL transmission shall be suppressed, to keep the current and/or thermal dissipation limitations.

In the following more specific examples will be described:

In case the embedded mobile communication system is deployed in a system limited by an average current limitation and a peak current limitation, but the peak current limitation for one TTI is higher than the maximum needed in one TTI, the method employs a controlled and repeated insertion of UL transmission gaps on the network interface in order to secure that the average power consumption is below the average current limit.

In case the embedded mobile communication system is deployed in a system limited by an current limitation, where the current limitation for one TTI is smaller than the maximum needed in one TTI, an energy storage (e.g. battery or capacitor) is used in combination with a controlled and repeated insertion of UL transmission gaps on a network interface in order to have a pattern of
  1 UL TTI where the UL transmission is not done and instead the available excess power is used to charge the energy storage, and
  several TTIs which can be transmitted with the correct scheduled UL transmission power even it exceeds the current limitations for these TTIs.

According to an aspect, the invention relates to a method for managing a power consumption of a mobile communication device which is capable of transmitting transmission data at a transmission data rate towards a communication network. The management of the power consumption may comprise limiting the power consumption or limiting energy consumption or limiting average power consumption or limiting average energy consumption of the mobile communication device.

Preferably, the method comprises reducing the transmission data rate within a certain transmission time interval to reduce an energy consumption of the mobile communication device within that certain transmission time interval by an amount of energy. Thus, by reducing the energy consumption within the certain transmission time interval, the power consumption of the mobile communication device is reduced. The method further comprises storing the amount of energy. By way of example, the amount of energy may be stored in an energy storage which may be capable of accumulating energy provided thereto.

According to an embodiment, the method may comprise providing at least a part of the stored amount of energy in addition to providing power supply energy to the mobile communication device within another transmission time interval. By way of example, the mobile communication device may be energized by the power supply providing energy to the mobile communication device via an energy interface, e.g. a USB (Universal Serial Bus) interface, which may be subject to an energy limitation. Thus, the additionally provided amount of energy contributes to an increase of the total energy within the certain transmission time interval so that e.g. increased data rates are possible without going beyond the energy or power limit.

According to an embodiment, the method may comprise reducing the transmission data rate in dependence on energy available for at least one transmission time interval and an expected energy consumption during the at least one transmission time interval, e.g. during a subsequent or a following transmission time interval. The expected energy consumption may be estimated upon the basis of a known relationship between e.g. a data rate and consumed energy.

According to an embodiment, the method may comprise determining the certain transmission time interval in dependence on energy available for at least one transmission time interval and an expected energy consumption during the at least one transmission time interval, and/or environmental conditions, in particular temperature and/or a power limit, and/or an average power limit and/or a temperature limit and/or a capability limit of a power supply energizing the mobile communication device. The certain transmission time interval may be determined in advance as one of the following or subsequent transmission time intervals.

According to an embodiment, the amount of energy may correspond to a difference between energy available for the certain transmission time interval and energy consumed within the certain transmission time interval. The energy available for the certain transmission time interval may by provided by a power supply energizing the mobile communication device and/or by an additional storage storing another amount of energy saved during another transmission time interval according the principles described herein.

According to an embodiment, the reduction of the transmission rate within the certain transmission time interval may be performed if a transmission of the transmission data is expected to contribute to an energy consumption exceeding the available energy within the certain transmission time interval and/or within another transmission time interval. In order to reduce the transmission data rate, the transmission of the transmission data may be at least partly disabled by e.g. not transmitting at least a part of user data and/or by not transmitting at least a part of control data.

According to an embodiment, the method may comprise determining an expected energy consumption during at least one transmission time interval, e.g. during the certain transmission time interval or during another transmission time interval. The expected energy consumption may be determined upon the basis of a rate dependent relationship between a transmission power and a power consumption, and/or at least one network parameter, e.g. a transmission bandwidth or a scheduled transmission power or a scheduled transmission data rate and/or a scheduled reception data rate. Preferably, the expected energy consumption may represent the above-mentioned energy consumption. In order to determine the expected energy consumption, a dependency between the power consumption and the transmission power may be exploited. Such a dependency may be derived upon the basis of measurements and/or linear or non-linear functions linking the above mentioned parameters.

According to an embodiment, the transmission data may comprise user data and control data. Preferably, the method comprises reducing the user data and transmitting the control data without reducing the control data rate within the certain time interval, and/or reducing the user data rate and the control data rate within the certain time interval. In order to reduce the respective data rate, the user data and/or the control data scheduled for transmission within the certain time interval may at least partly be suppressed or a transmission gap may be introduced within the certain time interval.

According to an embodiment, the method may further comprise transmitting transmission data scheduled for transmission within the certain time interval within another time interval to reduce the transmission data rate within the certain time interval. In other words, the data scheduled for transmission within the certain time interval may be delayed and at least partly transmitted within the other time interval. The delayed data may e.g. be stored in a memory.

According to an embodiment, the method comprises the reducing the transmission data rate by e.g. manipulating an uplink resource allocation received over the communication network prior to delivering the uplink resource allocation to a medium access control layer of the mobile communication device, and/or by disabling the reception of the uplink resource allocation, and/or by canceling the transmission of the transmission data. Thus, by manipulating the uplink resource allocation or by disabling the reception of the same, higher protocol layers may not be informed to schedule any transmission data for transmission within the certain time interval.

According to an embodiment, the certain transmission time interval may be associated with a certain transmission time index of a transmission period. In other words, the certain transmission time interval may be a certain time interval within the transmission period during which a plurality of transmission time intervals may be allocated, wherein each transmission time interval may be associated with a transmission time index indicating its position within the transmission period. Accordingly, a corresponding arrangement of transmission time intervals may be found during another transmission period. Preferably, the method may comprise reducing the transmission data rate during another transmission time interval which is associated with another transmission time index of another transmission period, wherein the other transmission time index differs from the certain transmission time index, so that a reduction of transmission data rates in corresponding time intervals of different transmission periods may be avoided. The transmission period may be determined by a time interval between HARQ downlink transmissions or re-transmissions transmissions. By way of example, a number of disabled transmission time intervals may be considered in order to avoid suppressing a frame feedback which is connected to the same HARQ instance (Hybrid Automatic Repeat Request) instance as a downlink frame feedback which has already been suppressed before. In other words, a transmission time interval jitter is introduced.

According to an embodiment, the mobile communication device may be capable of receiving data over the communication network from e.g. a network server entity.

Preferably, the mobile communication device may be arranged to transmit a reception acknowledgement towards the communication network upon receiving the data. If the reception acknowledgement is scheduled to be transmitted within the certain transmission time interval within which the data rate is to be reduced then it appears likely that the reception acknowledgement will not be transmitted during the certain transmission time interval. In order to further save energy, the method may thus comprise discarding the received data if the reception acknowledgement indicating the reception of the received data is scheduled to be transmitted towards the communication network within the certain transmission time interval. By discarding the received data, a further processing thereof may be avoided which contributes to a further power consumption reduction. This approach exploits the assumption that the received data will again be transmitted over the communication network since the missing reception acknowledgement usually indicates a reception error inducing a retransmission of data assumed to be lost or received in error.

According to a further aspect, the invention relates to a mobile communication device for transmitting transmission data towards a communication network. The mobile communication device comprises a power supply interface for providing energy to the mobile communication device, a power management unit interfacing with the power supply interface in order to e.g. receive the energy to energize the mobile communication device, and a network interface which is configured to reduce a transmission data rate within a certain transmission time interval to reduce an energy consumption of the mobile communication device by an amount of energy, wherein an energy storage is provided for storing the amount of energy. The energy storage may be arranged in the power management unit. However, the energy storage may also be arranged in the network interface. The mobile communication device may be a mobile communication terminal being capable of communicating over a communication network according to e.g. anyone of the known communication technologies. However, the mobile communication device may be implemented as a USB device or a PCMi card which may be connected to a mobile terminal, for example to a mobile computer or to a mobile phone. The mobile terminal may comprise a primary source energizing the mobile communication device via the power supply interface. Thus, the energy storage is additionally provided as a secondary energy source for e.g. storing not consumed energy during the certain time interval according to the principles described herein.

According to an embodiment, the mobile communication device may further comprise a transmission control for determining the certain transmission time interval in dependence on energy available for at least one transmission time interval and an expected energy consumption during the at least one transmission time interval. The transmission control may further be configured to provide information indicating the certain transmission time interval to the network interface. Thus, the network interface may determine the certain transmission time interval within which the energy consumption shall be reduced upon the basis of the information provided by the transmission control. The transmission control may be implemented in software or in hardware within e.g. the power management unit or within the network interface.

According to an embodiment, the mobile communication device may be configured to transmit the transmission data according to the Universal Mobile Telecommunication System (UMTS), and/or Global System for Mobile Communications (GSM) and/or Long Term Evolution technology, and/or Code Division Multiple Access 2000 (CDMA2000) communication technology. Generally, the mobile communication device may be arranged to communicate using any other known wireless communication technology.

The present invention also concerns computer programs comprising portions of software codes in order to implement the method as described above when operated by a respective processing unit of a user device and a recipient device. The computer program can be stored on a computer readable medium. The computer-readable medium can be a permanent or rewritable memory within the user device or the recipient device or located externally. The respective computer program can be also transferred to the user device or recipient device for example via a cable or a wireless link as a sequence of signals.

In the following, detailed embodiments of the present invention shall be described in order to give the skilled person a full and complete understanding. However, these embodiments are illustrative and not intended to be limiting.

DETAILED DESCRIPTION OF EMBODIMENTS

As general note, it is to be understood that this invention is not limited to the particular component parts of the devices, steps or methods described, but covers also variations being obvious for a person skilled in the art. It is further to be understood that the terminology used herein is for purposes of describing particular embodiments only, and is not intended to be limiting. It is further noted that, as used in the specification and the appended claims, the singular forms "a," "an" and "the" include singular and/or plural referents unless the context clearly dictates otherwise.

Figure 1:
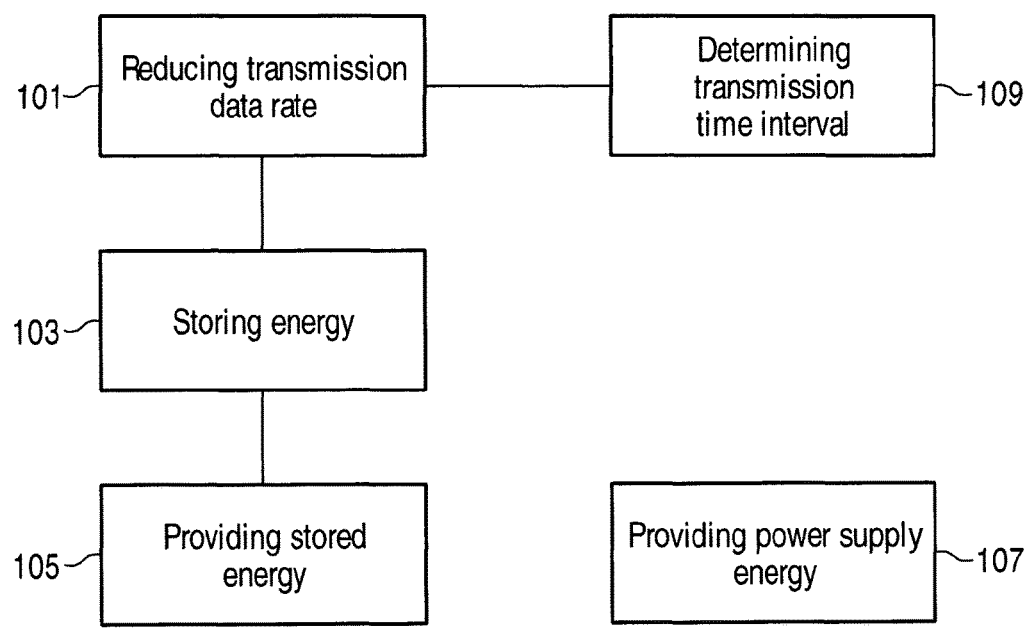
FIG. 1 shows a diagram of a method for managing a power consumption of a mobile communication device.

FIG. 1 shows a diagram of a method for managing a power consumption of a mobile communication device. Preferably, the method comprises reducing 101 a transmission data rate within a certain transmission time interval in order to reduce an energy consumption of the mobile communication device by an amount of energy, and storing 103 the amount of energy e.g. in an energy storage. As depicted in FIG. 1, the method may further comprise providing 105 the stored energy in order to additionally energize the mobile communication device which may usually be energized by a primary power supply energy source. Optionally, the method may comprise providing 107 the power supply energy to the mobile communication device.

The stored energy may correspond to an amount of energy which may be saved during the certain time interval when the transmission data rate is reduced. This energy may be provided by the main power source energizing the mobile communication device. Thus, the power supply energy provided in the step 107 may be used to charge an energy storage in order to store the amount of energy during the certain transmission time interval. The method may further comprise determining 109 the certain transmission time interval within which the data rate may be reduced.

Figure 2:
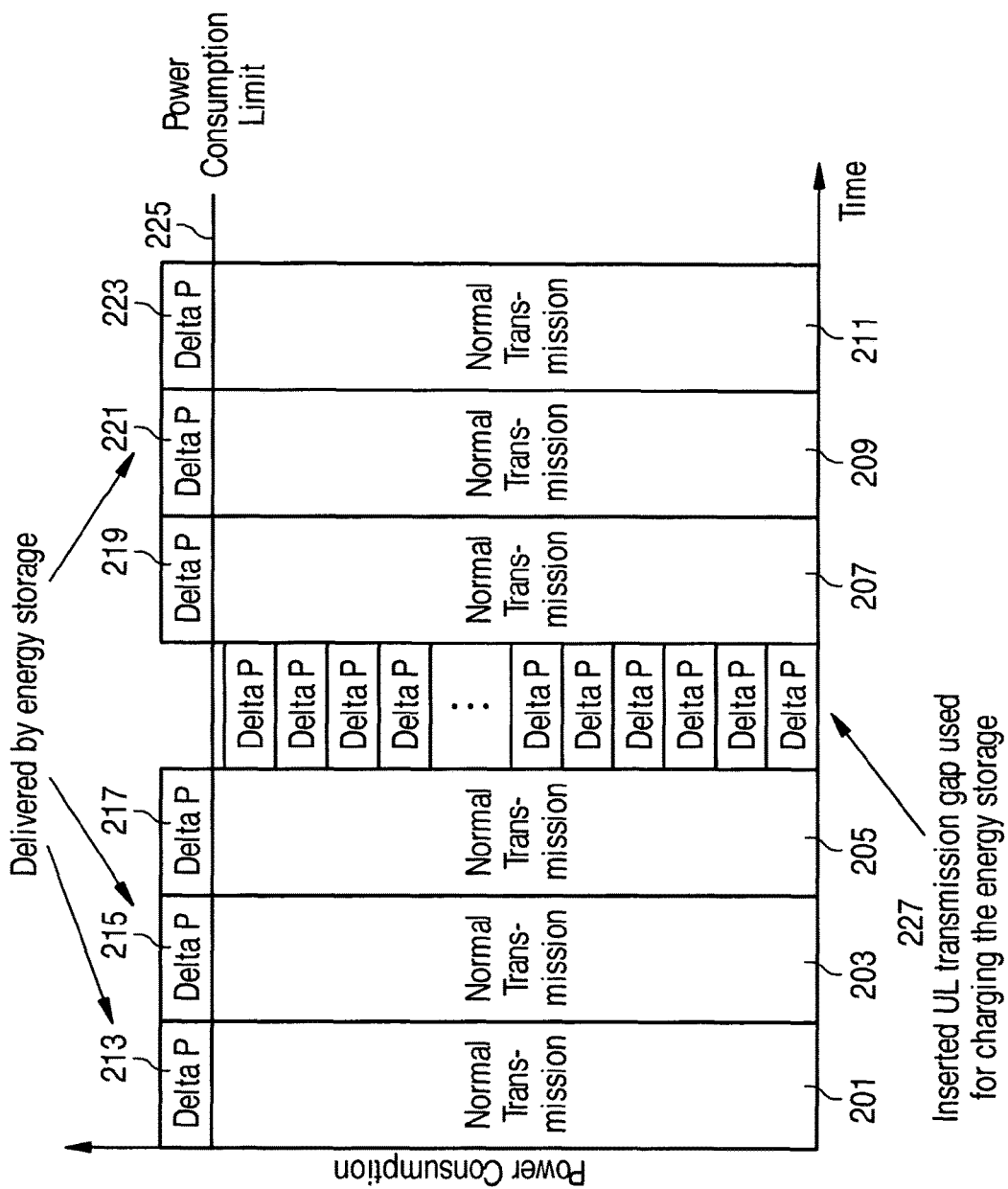
FIG. 2 demonstrates a transmission gap insertion.

FIG. 2 depicts a resulting power consumption progress versus time when employing the method for managing the power consumption of a mobile communication device. In particular, FIG. 2 shows power consumptions 201 to 211 within transmission time intervals during which a normal transmission or data, i.e. the transmission of actually scheduled data, is performed. The electrical power for the power consumptions 201 to 211 may be provided by e.g. a primary energy source energizing the mobile communication device, e.g. by a power supply. By way of example, it may occur that the available energy provided by the primary energy source is not sufficient to cover the expected energy demand. Though, in order to assure the scheduled data transmissions, additional energy or power amounts 213 to 223, also referred to by delta P, may be provided. These additional energy or power amounts 213 to 223 may, however, also be used in order in order to overcome a power transmission limit 225 limiting the primary energy source with respect to a maximum power or energy. Such a limit may e.g. result when energizing the mobile communication device via an interface which is subject to power or energy restrictions or limitations. The additional energy amounts 213 to 223 contribute to an increase of the available power by delta P, respectively, in order to assure the normal data transmission.

The additional energy amounts 213 to 223 may be delivered by an energy storage which shall preferably be charged before. In order to charge the energy storage, the transmission data rate may be reduced during a certain time interval 227 which may be arranged between the transmission time intervals 205 and 207. By introducing the transmission gap during the certain transmission time interval 227, the average power consumption may be reduced to or below the power consumption limit 225 by simultaneously enabling transmission data rates which are usually associated with power consumptions above the power consumption limit 225 during at least one another transmission time interval.

By way of example, the certain transmission time interval may form an uplink transmission gap which is used for charging the energy storage. It shall be noted that the additional amounts of energy 213 to 223 generally may be provided only within transmission time intervals requiring an increased energy for additional data transmission.

Figure 3:
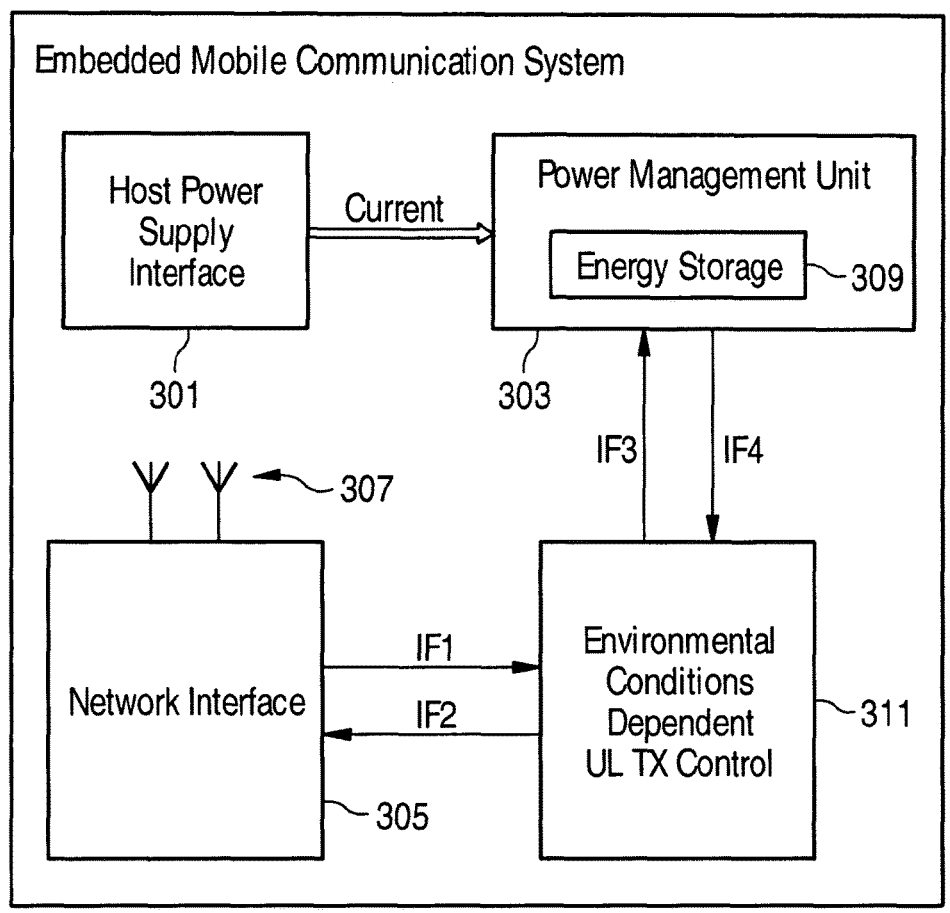
FIG. 3 shows a block diagram of a mobile communication device.

FIG. 3 shows a block diagram of a mobile communication device which may be implemented as an embedded mobile communication system, e.g. a USB device such as USB dongle and/or a USB stick being operated as a single-mode USB dongle and/or USB stick and/or as a LTE and/or WCDMA and/or GPRS USB dongle stick or a CDMA USB dongle and/or stick. The mobile communication device may further be implemented to form a PCIe mini card, e.g. a single-mode PCIe mini card and/or a LTE and/or a WCDMA and/or a GPRS PCIe mini card and/or a LTE and/or CDMA PCIe mini card.

The mobile communication device may comprise a power supply interface 301 for providing energy to the mobile communication device from a host comprising e.g. a primary energy source. A power management unit 303 may interface with the power supply interface 301 for receiving energy or power, e.g. a current.

The mobile communication device may further comprise a network interface 305 having one or more antennas 307 for transmitting radio frequency signals towards the communication network. Preferably, the network interface 305 may be configured to reduce a transmission data rate within a certain transmission time interval in order to reduce an energy consumption of the mobile communication device by an amount of energy. The amount of energy may be received from an external power supply source which may interface with the power supply interface 301. In order to store the additional amount of energy, the power management unit 303 may comprise an energy storage 309. However, the energy storage 309 may be arranged within the network interface 305 or may directly be coupled to the power supply interface 301.

According to an embodiment, the power management unit 303 may directly be coupled to the network interface 305 in order to inform the network interface 305 e.g. about the certain transmission time interval during which the transmission data rate shall be reduced. According to another embodiment depicted in FIG. 3, a transmission control 311 may be provided in order to determine the certain transmission time interval in dependence on e.g. energy available for at least one transmission time interval and an expected energy consumption during at least one transmission time interval, e.g. during any following transmission time interval. In particular, the transmission control 311 may be configured to provide information indicating the certain transmission time interval to the network interface 305. In either case, the network interface 305 may reduce the transmission data rate by inserting a transmission gap during the certain time interval. However, the network interface 305 may only reduce user data rate and transmit control data in order to e.g. maintain a connection of a control channel with the communication network. Furthermore, the network interface 305 may only partly reduce the user data rate in order to reduce the transmission data rate.

The transmission control 311 may be implemented in hardware or in software separately or within the power management unit 303 or within the network interface 305. By way of example, the transmission control 311 may perform environmental conditions dependent uplink transmission control (UL TX control) so that e.g. the transmission data rate may be reduced in dependence on environmental conditions such as temperature. By way of example, the transmission control 311 may communicate with the network interface 305 via the interfaces IF1 and IF2. Correspondingly, the transmission control 311 may communicate with the power management unit 303 via the interfaces IF3 and IF4.

It shall be noted that FIG. 3 depicts a part of an exemplary architecture of an embedded mobile communication system allowing controlling the uplink transmission via a network interface according to e.g. the 3GPPP LTE standard in dependency on the environmental conditions like the available power or energy and/or temperature. However, the mobile communication device may be implemented in hardware or in software without forming an embedded system or without being a part thereof.

In the following, exemplarily functionalities of the power supply interface 301, of the power management unit 303, of the network interface 305 and of the transmission control 311, forming an embodiment of an environmental conditions dependent UL TX Control architecture, are addressed:

The power may be supplied to the mobile communication device via the host power supply interface 301. For a PCIe card, the interface 301 may be an interface to a 3.3V plus an optional 1.5V power supply. For a USB dongle/stick it may be a 5V power supply.

The power management unit 303 may distribute the current to be consumed to the different building blocks of the embedded system. The optional energy storage 309 (battery or capacitors) may be attached to the embedded system and may deliver additional current for a short term in case the host power supply is not sufficient. It shall be noted that the energy storage 309 should preferably be loaded before. The power management unit 303 and charging the energy storage 309 may be controlled via the interface IF3. Optionally, the interface IF4 is provided to deliver actual measured values of the host power supply capabilities, the stored energy in the energy storage 309 and the consumed energy within a certain transmission time interval, which could be used to calibrate certain functions inside the Environmental Conditions Dependent UL TX Control function of the transmission control 311.

With reference to the Environmental Conditions Dependent UL TX Control function of the transmission control 311, this functional block may execute one or a plurality of the following functions: a Power Supply Capability Detection function, an Energy Consumption Forecast Calculation, an Environmental Conditions Dependent UL TX Manipulation function, and further functions described in the following:

The Power Supply Capability Detection function may detect the capabilities of the host power supply 301. This may comprise a static and/or a dynamic part. The static part is e.g. dependent on the deployment of the embedded system like e.g. in a PCIe card or a USB dongle/stick and is either known in the system via hard-coded parameters such as compiler switches or software configuration parameters or can be detected via hardware mechanisms at the start-up phase. The dynamic part of the host power supply capabilities is e.g. the number of USB ports which are connected to the host and the maximum and average current values which can be supplied by the host on each of these USB ports. In case of the USB, e.g. the number of USB ports currently connected to the host can be detected by hardware auto-sensing mechanisms. Also in case of the USB, e.g. the maximum and average current values which can be supplied by the host on each of the USB ports are negotiated via the USB protocol and are received by the Power Supply Capability Detection e.g. from the USB stack in the system. Optionally it uses actual measured values of the host power supply to detect its capabilities.

The Energy Consumption Forecast Calculation function may calculate the expected energy consumption of the mobile communication device being e.g. implemented into an embedded system for the next, n-th, TTI and may optionally estimate a forecast of the expected energy consumption for the following TTIs (n+1, n+2, . . . ) from parameters provided by the network interface 305 via the interface IF1. Such parameters are e.g. the used bandwidth, the scheduled UL transmission power and the scheduled UL and DL data rates. Note, that in some systems also the expected energy consumption of the TTI n+1 can be calculated in case the network interface 305 can provide the needed parameters right in time to the Environmental Conditions Dependent UL TX Control function. In order to calculate and estimate the expected energy consumption it may be assumed that the dependency between the considered parameters, e.g. the used bandwidth, the scheduled UL transmission power and the scheduled UL and DL data rates, and the energy consumption for all data rates is known to the Environmental Conditions Dependent UL TX Control function. According to one implementation, these curves may be measured in the lab beforehand and stored in the Environmental Conditions Dependent UL TX Control function. According to another optional implementation, the curves or parts of the curves are measured and recorded during a runtime.

The expected energy consumption may be determined by a static energy consumption, which is independent on any variations in the network interface 305, but dependent on the operating mode of the platform, a semi-static energy consumption, which is dependent on parameters which are negotiated at the time the UE registers itself in the network, e.g. the used bandwidth, a dynamic energy consumption, which can vary at each TTI and which is dependent on e.g. the scheduled UL transmission power and the scheduled UL and DL data rates.

An Environmental Conditions Dependent UL TX Manipulation function may decide dependent on the available energy for the next and for the following TTIs and dependent on the expected energy consumption for the next and the following TTIs, whether the UL transmission has to be suppressed and in which UL TTI this suppression shall happen. This is in order to ensure that the embedded mobile communication device keeps the current and thermal dissipation limitations. The information which UL TTI has to be suppressed is sent via IF2 to the network interface 305.

The network interface 305 may comprise a hardware and/or software functions for realizing the interface of the embedded mobile communication device towards the wireless network. In case of an LTE UE this e.g. includes the layer 1, layer 2 and layer 3 according to the 3GPP standard for LTE. It provides two interfaces towards the Environmental Conditions Dependent UL TX Control function. The interface IF1 delivers the necessary parameters like the used bandwidth, the scheduled UL transmission power and the scheduled UL and DL data rates which the Environmental Conditions Dependent UL TX Control function needs in order to takes it decision. The interface IF2 provides the possibility to the Environmental Conditions Dependent UL TX Control function to manipulate the network interface 305 by e.g. ordering the suppression of certain UL TTIs. The suppression of UL TTIs can be performed by manipulating the received UL resource allocation transmitted by the network before delivery to Layer2 (MAC layer), by disabling the reception of the UL resource allocation transmitted by the network on the PHY layer or by cancellation of the UL transmission on the PHY layer.

In case the embedded mobile communication system is deployed in a system limited by an average current limitation and a peak current limitation, but the peak current limitation for one TTI is higher than the maximum needed in one TTI, the method may perform a controlled and repeated insertion of UL transmission gaps on the network interface in order to secure that the average power consumption is below the average current limit.

In case an embedded mobile communication system is deployed in a system limited by an current limitation, where the current limitation for one TTI is smaller than the maximum needed in one TTI, the energy storage 309 (e.g. battery or capacitor) is used in combination with a controlled and repeated insertion of UL transmission gaps on a network interface in order to have a pattern comprising one UL TTI where the UL transmission is not done and instead the available excess power is used to charge the energy storage and/or a plurality of TTIs which can be transmitted with the correct scheduled UL transmission power even it exceeds the current limitations for these TTIs.

A further function is a static and dynamic Power Supply Capability Detection and usage of the result for controlling the UL transmission on a network interface.

A further function is an Energy Consumption Forecast Calculation, i.e. calculation of the expected energy consumption of the embedded system for the next TTI n and estimation of a forecast of the expected energy consumption for the following TTIs (n+1, n+2, . . . ) from parameters provided by the network interface 305 like e.g. the used bandwidth, the scheduled UL transmission power and the scheduled UL and DL data rates and usage of the result for controlling the UL transmission on a network interface.

The controlled and repeated insertion of UL transmission gaps may cause towards the network a similar behavior than the situation that the UE misses the UL grant sent by the network for a TTI and therefore does not schedule a transmission on the UL for this TTI. In this case the network may be enhanced in order to handle such situations.

In case of LTE the UL frames do not only contain the UL user data but also the UL control data. This control data is mainly used to give feedback on received DL data. In case this feedback information is not received the network will assume that the DL data has not been received by the UE and thus will repeat the transmission. This leads to the following optimization. In case the DL acknowledge should not be dropped the UE also has the possibility to only send the UL control information containing the feedback information that DL data has been received by the UE to the network. For LTE this could be done via the PUCCH (Physical Uplink Control Channel).

It may, furthermore, be considered that the thermal dissipation is adapted with a certain time shift for determining which UL TTIs shall be suppressed.

Figure 4:
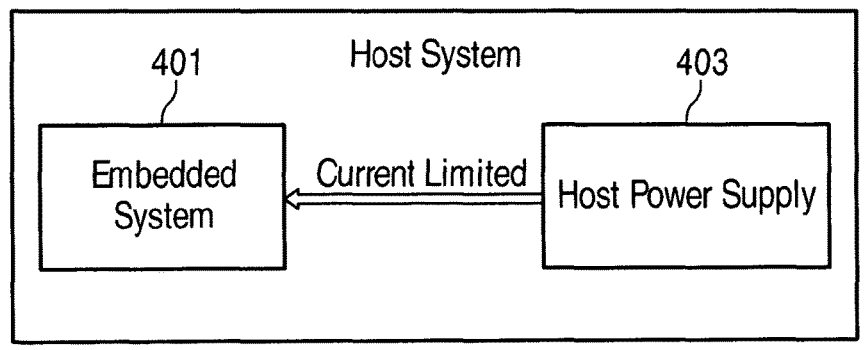
FIGS. 4A and 4B show a mobile communication device.
Figure 4:
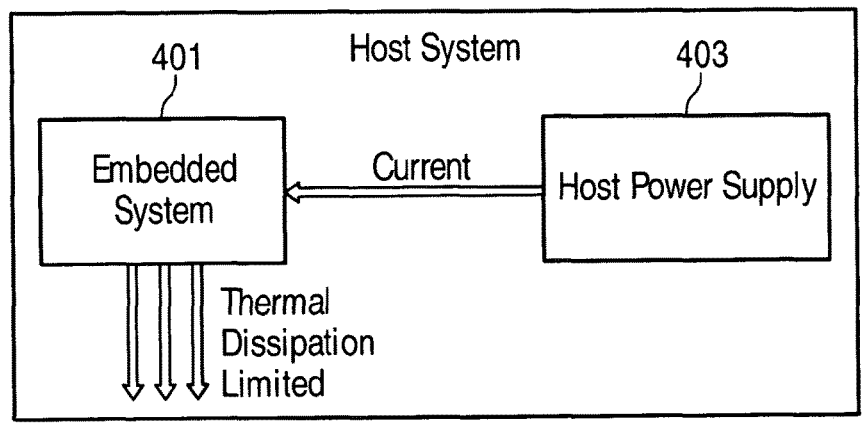

FIGS. 4A and 4B show a mobile communication device 401 which is powered by a primary energy source 403, e.g. a host power supply, of a host system. By way of example, the mobile communication device 401 may be implemented as an embedded system interfacing with the host power supply 403 via a power supply interface which may be subject to power restrictions or power limitations associated with the respectively used interface technology. As depicted in FIGS. 4A and 4B, integrated embedded systems may be current or thermal dissipation limited. With reference to FIG. 4A, the host system is current limited resulting from a limitation of the host power supply 403. With reference to FIG. 4B, also the maximum allowed thermal energy dissipation may by limited which simultaneously limits the maximum allowable energy or power consumption by the mobile communication device 401.

Figure 5:
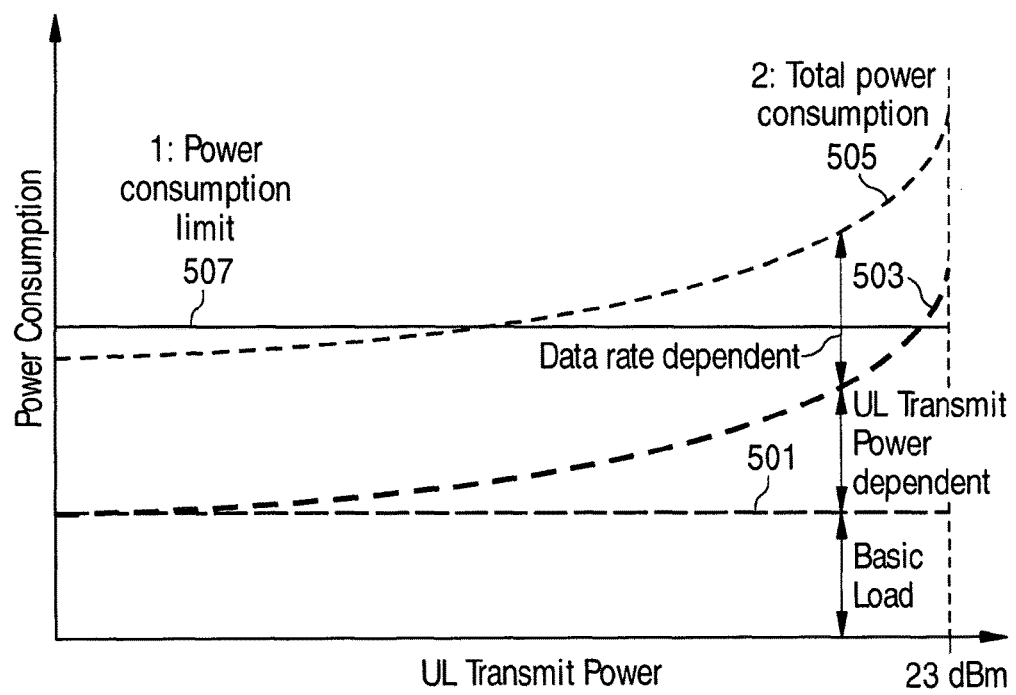
FIG. 5 shows a power consumption diagram.

FIG. 5 shows a power consumption diagram of an embedded mobile communication system versus uplink transmit power, wherein a basic power consumption 501 may be determined by a constant basic load. If, additionally, an uplink transmit power dependent portion of the energy consumption is considered, then the resulting power consumption curve 503 tends to increase with increasing uplink transmit power. A further rate dependent portion of the power consumption may contribute to a further increase of the power consumption which results in a total power consumption 505 which may exceed a power consumption limit 507 which may be determined by a power capability of an interface via which the mobile communication device is energized. In order to reduce the total power consumption 505 below the power consumption limit 507, the data rate dependent part of the power consumption may be reduced by reducing the transmission data rate by e.g. reducing an amount of data to be transmitted within a certain time interval or by introducing a transmission gap within the certain time interval.

The basic power consumption 501 may e.g. indicate an exemplary average power consumption limit for the embedded mobile communication system required by the used interface technology, e.g. 2.5 W for a single mode USB Dongle/Stick (2.3 W−X+UL Transmit Power) belonging to a multi mode PCI card or for a multi mode class 1 PCIe card where X corresponds to the power consumption of another platform and the heat dissipation is used as limiting factor for the power consumption), while the second line 505 shows an exemplary total power consumption.

Regarding the maximum UL transmit power, e.g. the 3GPP standard defines several power classes. A goal for a mobile platform may to allow class 3 UEs which means that a maximum output power of 23 dBm may be handled. As can be seen can see from FIG. 5 this can not be achieved for all scenarios. Dependent on the actual data rates and/or the actual UL transmit power there are cases which would require more power than allowed or available by e.g. a particular interface standard, which may, however, be overcome according to the principles described herein.

A further solution to the above problem is to reduce the embedded mobile communication system's power class to a class which requires less output power. Another further solution is to reduce the UE category of the device to a category which requires less data rates. A third solution could be the combination of these two solutions. Both solutions may also additionally be employed.

Figure 6:
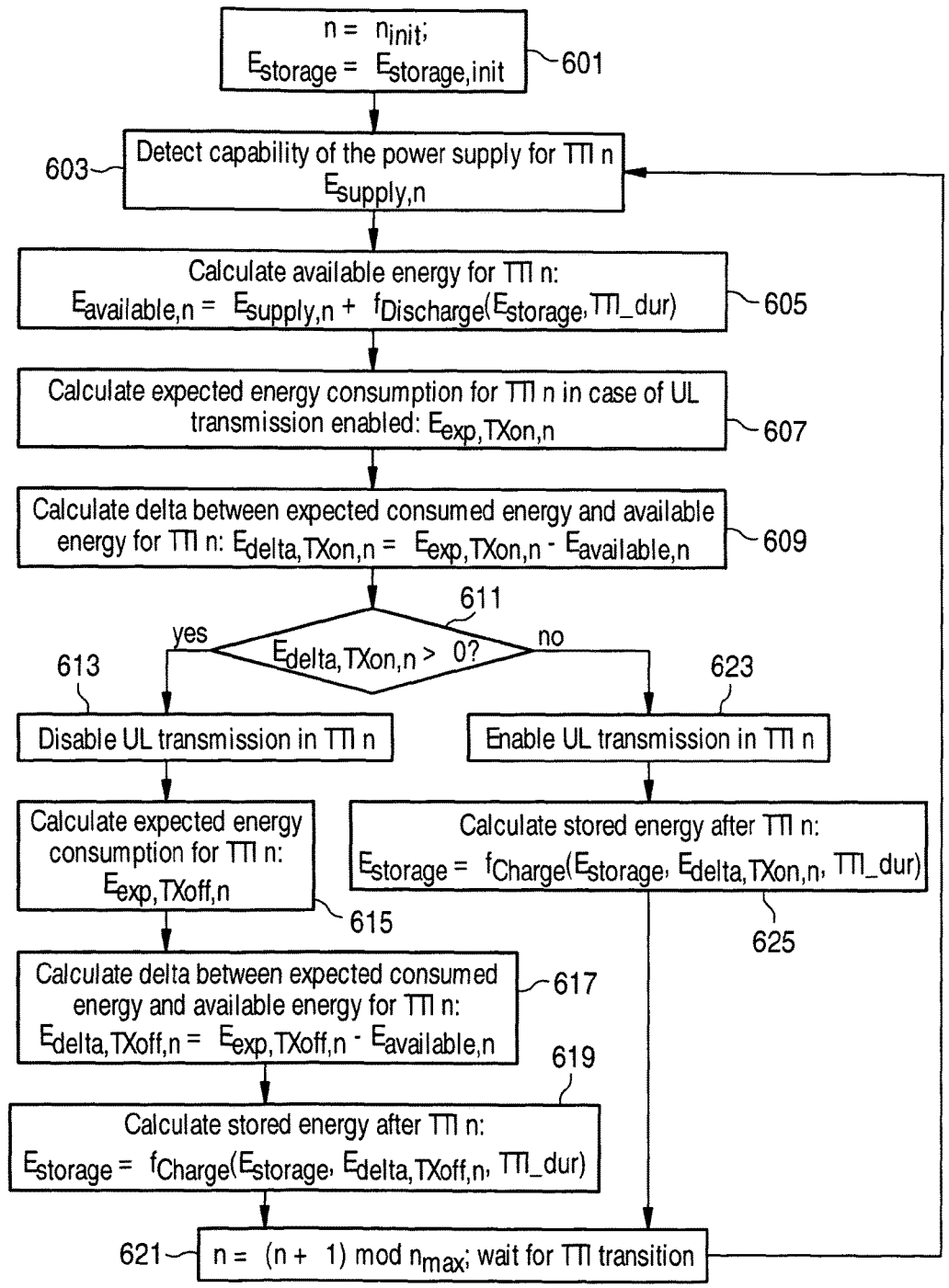
FIG. 6 shows a diagram of a method for managing a power consumption of a mobile communication device.

FIG. 6 shows a diagram of a method for managing a power consumption of a mobile communication device. The method may comprise determining 601 an initial stored energy as to whether an energy Estorage, init. Simultaneously, an initial transmission time interval count number, ninit which may be provided by the network interface 305 is assigned to a variable n. In a further step 603, the capabilities of a power supply energizing the mobile communication device for a n-th transmission time interval (TTI) may be detected, wherein the capabilities may be expressed as energy Esupply,n. In a further step 605, a calculation of the energy available for the n-th TTI may be performed upon the basis of e.g. the following formula:

$$Eavailable, n = Esupply, n + fDischarge(Estorage, TTI\_dur),$$

wherein TTI_dur denotes a duration of a TTI and wherein fDischarge denotes a function which delivers the energy stored in the energy storage after a given discharging time in dependence e.g. on the energy stored before discharging and the discharging time interval. In a further step 607, an expected energy consumption for the n-th TTI is calculated in the case of an enabled UL transmission which may be expressed by an energy Eexp, TXon, n. It shall be noted that Eexp, TXon, n may also express the expected energy if an uplink transmission has not been scheduled for the TTI referred to in step 607.

In a further step 609, a delta between expected consumed energy and available energy for the n-th TTI may be calculated upon the basis of the following formula:

$$Edelta, TXon, n = Eexp, TXon, n - Eavailable, n.$$

In a further step 611, the calculated energy delta is compared to zero. If the calculated energy delta is greater than zero, then, in a step 613, a transmission in the n-th TTI, e.g. an uplink transmission, may be disabled. In a further step 615, an expected energy consumption for the n-th TTI in case of a e.g. a disabled UL transmission is calculated, wherein the expected energy is expressed by the energy Eexp, TXoff, n. In a further step 617, a delta between an expected consumed energy and an available energy for the n-th TTI is calculated upon the basis of e.g. the following formula:

$$Edelta, TXoff, n = Eexp, TXoff, n - Eavailable, n.$$

In a further step 619, a calculation of the stored energy after the n-th TTI may be performed upon the basis of the following formula:

$$Estorage = fCharge(Estorage, Edelta, TXoff, n, TTI\_dur),$$

wherein fCharge denotes a function which delivers the energy stored in the energy storage after a given charging time dependent e.g. on the energy store before charging, a charging time interval and the energy available for charging. In a further step 621, a TTI transition is awaited. Furthermore, the aforementioned variable n may be set to n=(n+1) mod nmax, wherein nmax denotes a maximum transmission time interval value or number or index.

With reference to step 611, if the calculated delta between the expected consumed energy and the available energy is not greater than zero, then, in a step 623, an uplink transmission in the n-th TTI may be enabled. In a further step 625, a stored energy after the n-th transmission time interval may be calculated upon the basis of the following formula:

$$Estorage = fCharge(Estorage, Edelta, TXon, n, TTI\_dur).$$

Hereafter, the method proceeds further with step 621.

As depicted in FIG. 6, the uplink transmission of the mobile communication device may be controlled in dependency on a power consumption directly by enabling and/or disabling the uplink transmission or by reducing a transmission data rate.

The method of FIG. 6 may e.g. be implemented within the transmission control 311 in order to manipulate the uplink transmission for managing the power consumption of the mobile communication device.

The method depicted in FIG. 6 may further exploit the following observations:

The mobile communication device, which may be implemented within an embedded mobile communication system, may know about the dependency between a transmission power and a power consumption for some or even for all data rates. Thus, the mobile communication device may determine the available energy for the next transmission time interval which may include the determination of the stored energy in an energy storage in case the energy storage is a part of the mobile communication device, and/or the consideration that all known limitations of the system affecting the power consumption, in an average and a peak current limitation and a thermal dissipation limitation are followed.

The mobile communication device may calculate the expected energy consumption within a next transmission time interval by using its knowledge about the dependency between the transmission power and the power consumption for some or for all data rates. The required parameters like e.g. the scheduled transmission power and/or the uplink (UL) and/or the downlink (DL) data rates may be provided by the network interface 305 shown in FIG. 3 on a transmission time interval base.

Still in reference to FIG. 6, in case of e.g. the LTE technology, the uplink frames may contain uplink user data and also the uplink control data. The control data is usually used to acknowledge a reception of downlink data. In case this feedback information is not received then the network may assume that the downlink data has not been received by the mobile communication device and will therefore will repeat the transmission. This facilitates the following optimization: if the downlink acknowledge should not be dropped then the mobile communication device may also have the possibility to send only uplink control information indicating that downlink data has been received by the mobile communication device. In the case of the LTE technology, the uplink control information may be transmitted via the physical uplink control channel (PUCCH).

According to an embodiment, instead of calculating the stored energy in the energy storage at the end of each control cycle of FIG. 6, the stored energy in the energy storage could be measured by the power management unit 303 as e.g. depicted in FIG. 3, and provided to the environmental controls dependent uplink transmission control 311 at the beginning of each control cycle, which can be performed for each transmission time interval. In addition or alternatively, the measurement may be performed from time to time and may be used to calibrate the stored energy calculation function of the transmission control unit 311.

The above embodiments refer, by way of example, to power or energy limited systems. However, these embodiments may also be employed in thermal dissipation limited systems, wherein it shall preferably be taken into account that an adaptation of the thermal dissipation may be associated with a certain time shift or time delay as shown in FIGS. 7 and 8.

Figure 7:
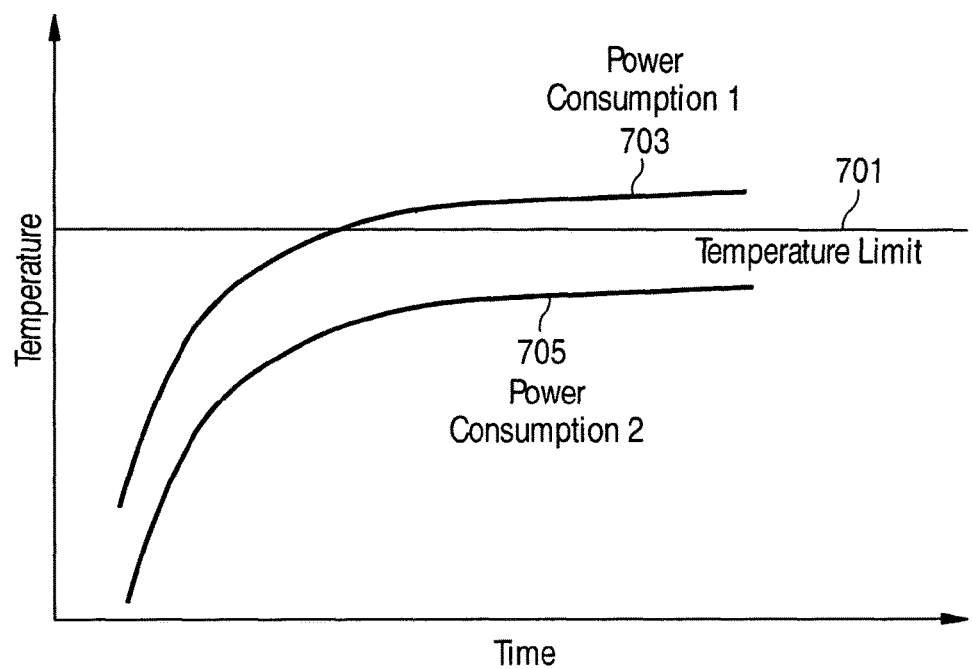
FIG. 7 shows power consumption related temperatures.
Figure 8:
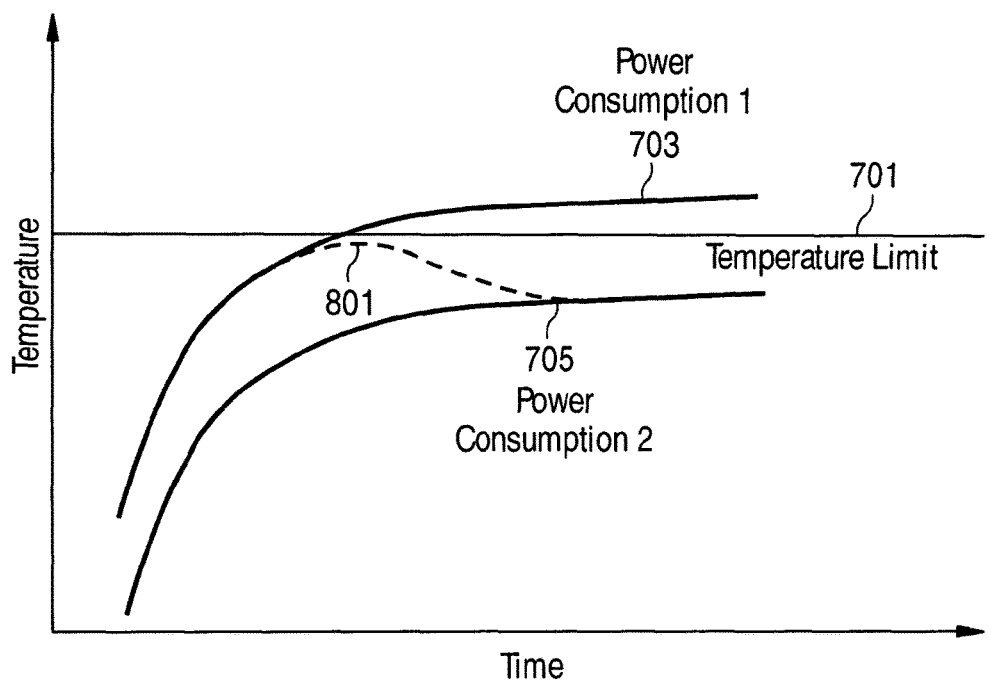
FIG. 8 shows power consumption related temperatures.

With reference to FIGS. 7 and 8, a temperature limit 701 may be exceeded by a first temperature 703 associated with a first power consumption. The first temperature 703 may non-linearly increase above a second temperature 705 associated with a second, reduced power consumption. In order to reduce the progression of the first temperature 703, a data rate reduction may be performed which reduces the power consumption and thus the temperature dissipation which may reverse the progression of the first temperature 703 such that a resulting temperature 801 is below the temperature limit 701.

According to an implementation, the resulting temperature 801 may only be reached after a certain time period as the system is still following the first temperature curve 703. This delay may or has to be taken into account when controlling thermal dissipation limited systems. Nevertheless, a significant temperature reduction may be achieved when employing the uplink transmission control.

According to some implementations, the uplink transmission of the mobile communication device may be controlled depending on the power consumption e.g. directly by enabling and/or disabling the uplink transmission (UL TX) and by taking one or more than one transmission time interval into account.

Figure 9:
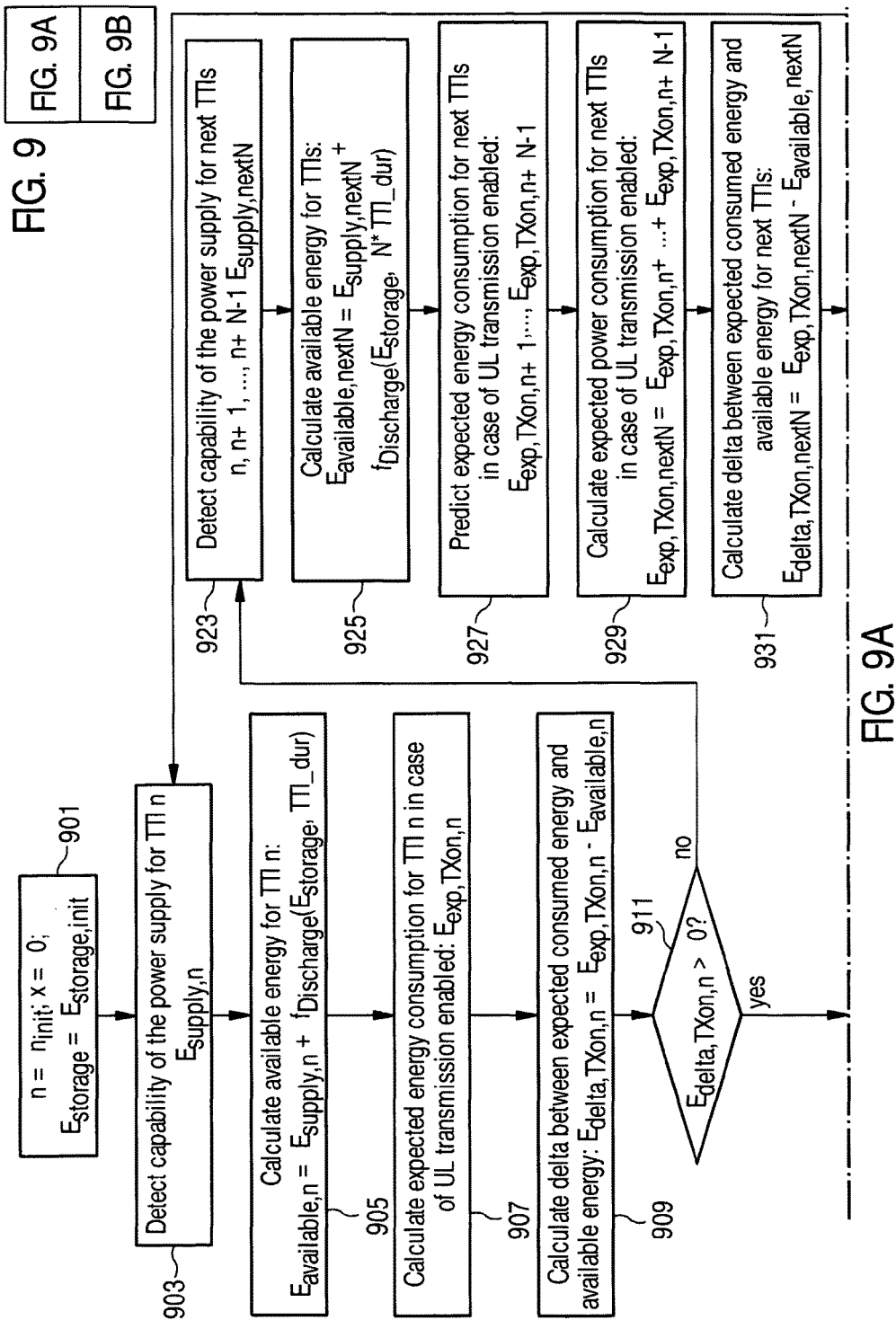
FIG. 9 shows a diagram of a method for managing a power consumption of a mobile communication device.
Figure 9B:
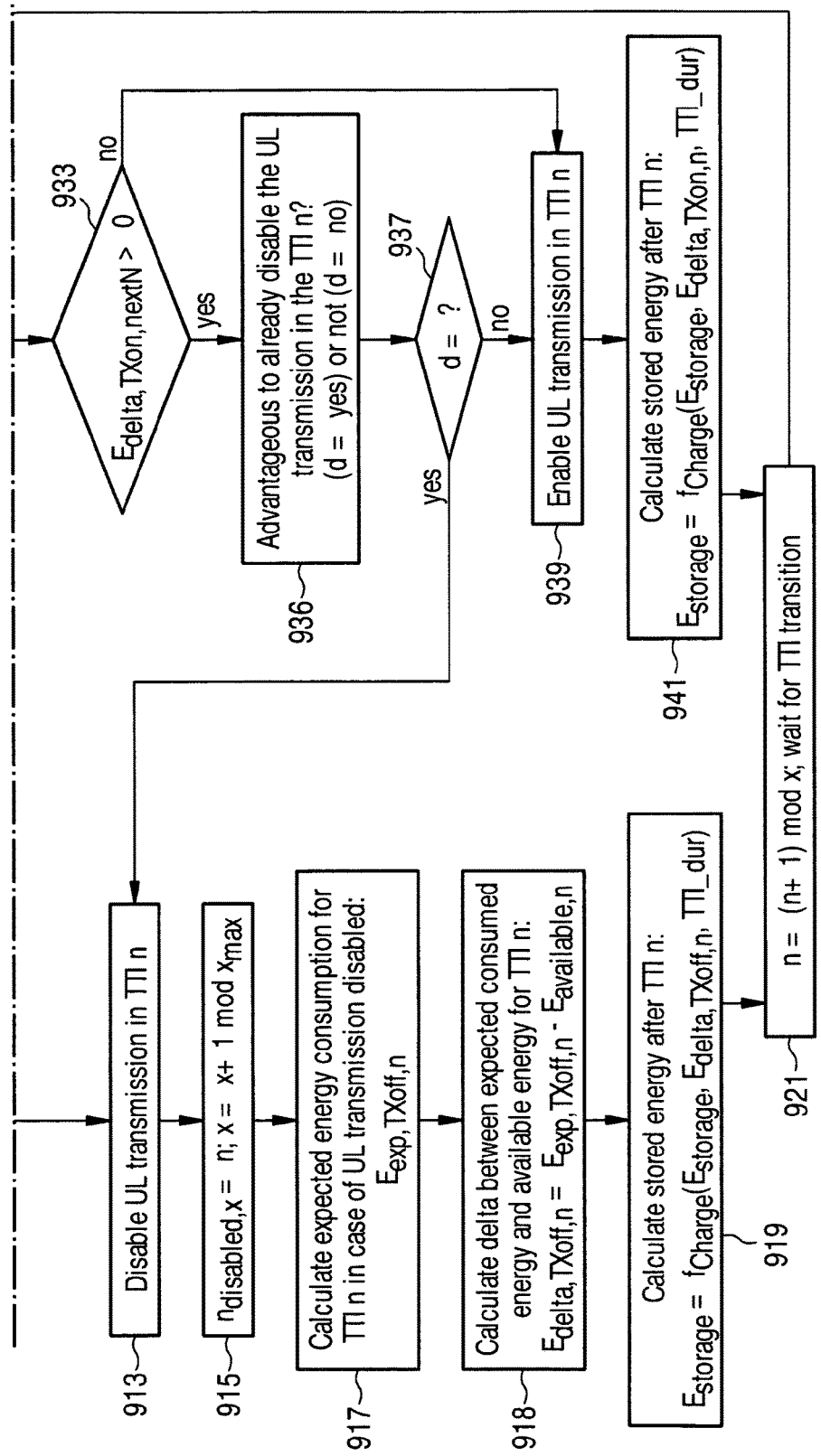

FIG. 9 shows a diagram of a method for managing a power consumption of a mobile communication device wherein more than one transmission time interval are taken into account. With reference to FIGS. 6 and 9, in step 901 the value Estorage is set to Estorage, init, wherein the variable n is set to ninit and wherein a variable x is set to zero. In a following step 903, a capability of the power supply for the n-th transmission time interval (TTI) is detected which may be expressed by the energy Esupply, n. In a following step 905, an available energy for the n-th TTI may be calculated upon the basis of the following formula:

$$Eavailable, n = Esupply, n + fDischarge(Estorage, TTI\_dur).$$

In a following step 907, an expected energy consumption for the n-th TTI is calculated in the case of an enabled UL transmission which may be expressed by an energy Eexp, TXon, n.

In a following step 909, a delta between an expected consumed energy and an available energy for the n-th TTI may be calculated upon the basis of the following formula:

$$Eexp, TXon, n = Eexp, TXon, n - Eavailable, n.$$

In a following step 911, Edelta, TXon, n is compared to zero. If a comparison result is greater than zero, then, in a step 913, an uplink transmission in the n-th TTI may be disabled which may be achieved by e.g. reducing a transmission data rate or by inserting a transmission gap.

In a following step 915, a variable n disabled, x is set to n in order to capture the number of disabled transmission time intervals. Furthermore, the variable x may be updated according to the following formula:

$$x = x+1 \bmod x\text{max}.$$

The additional parameter xmax may be used to indicate a maximum number of stored, disabled uplink transmission time interval locations.

In a following step 917, an expected energy consumption for the n-th transmission time interval may be calculated in a case when e.g. the uplink transmission is disabled. This may be expressed in terms of the energy Eexp, TXoff, n.

In a following step 918, a delta, i.e. a difference, between an expected consumed energy and an available energy for the n-th TTI may be calculated upon the basis of the following formula:

$$E\text{delta},TX\text{off},n = E\text{exp},TX\text{off},n - E\text{available},n.$$

In a following step 919, the stored energy after the n-th TTI may be calculated upon the basis of the following formula:

$$E\text{storage} = f\text{Charge}(E\text{storage},E\text{delta},TX\text{off},n,TTI\_\text{dur}).$$

In a following step 921, a TTI transmission may be awaited, wherein n may be updated upon the basis of the following formula:

$$n = (n+1) \bmod x.$$

With reference to step 911, if Edelta, TXon, n is smaller or equal to zero, then, in a step 923, a capability of the power supply for the next N TTIs n, n+1, . . . , n+N−1 may be detected which may be expressed by energy Esupply, nextN.

In a following step 925, the available energy for the next N TTIs may be calculated upon the basis of the following formula:

$$E\text{available},\text{next}N = E\text{supply},\text{next}N + f\text{Discharge}(E\text{storage},N*TTI\_\text{dur}).$$

In a following step 927, the expected energy consumption for the transmission time intervals n+1, n+2, . . . , n+N−1 may be predicted in case of an enabled uplink transmission which may be expressed in terms of the energies Eexp, TXon, n+1, . . . , Eexp, TXon, n+N−1.

In a following step 929, the expected power consumption for next N TTI in case on an enabled UL transmission may be calculated upon the basis of the following formula:

$$E\text{delta},TX\text{on},\text{next}N = E\text{exp},TX\text{on},n+ \ldots +E\text{exp},TX\text{on},n+N-1.$$

In a following step 931, a delta, e.g. a difference, between an expected consumed energy and an available energy for the next N TTIs may be updated upon the basis of the following formula:

$$E\text{delta},TX\text{on},\text{next}N = E\text{exp},TX\text{on},\text{next}N - E\text{available},\text{next}N.$$

In a following step 933, the determined energy delta is compared with zero. If Edelta, TXon, nextN is greater than zero then, in a step 936, it is determined as to whether it is advantageous to already disable the uplink transmission in the n-th TTI when considering the predicted expected energy consumption values for the next N TTIs and the available energy for the next N TTIs and optionally the TTIs, where the uplink transmission was disabled for the last xmax times. In this context, d may denote a decision variable so that, in a following step 937, it is determined as to whether d denotes "yes" or "no". If it is advantageous to disable the uplink transmission in the n-th TTI, then, starting from the step 937, the uplink transmission in the n-th TTI may be disabled in step 913. If d="no", then, in a step 939, the uplink transmission in the n-th TTI may be enabled. In a following step 941, the stored energy may be calculated after the n-th TTI upon the basis of the following formula:

$$E\text{storage} = f\text{Charge}(E\text{storage},E\text{delta},TX\text{on},n,TTI\_\text{dur}).$$

After step 941, the method proceeds further with step 921 from which the method may further proceed with step 903.

The consideration of the last xmax disabled UL TTIs in order to avoid the suppression of a DL frame feedback which is connected to the same HARQ instance as a DL frame feedback which was already suppressed before. Therefore an UL TTI is maybe suppressed earlier than needed, when e.g. evaluating whether the expected energy consumption for this TTI is higher than the available energy for this TTI, in order to avoid that following UL TTIs containing DL frame feedbacks for HARQ instances for which the DL frame feedback was already suppressed before are not suppressed again. This can also be performed by varying the occurrence of a disabled UL transmission TTI in a way that the repetition rate slightly varies for each period, e.g. y+1, y−1, y, . . . .

In case of LTE the UL frames do not only contain the UL user data but also the UL control data. This control data is mainly used to give feedback on received DL data. In case this feedback information is not received, the network may assume that the DL data has not been received by the UE and thus will repeat the transmission. This leads to the following optimization:

A block received in frame y is acknowledged in frame y+4. In case the UE would know already in frame y that frame y+4 will not be transmitted (which would be possible when using this method in case N>4) also the DL data reception and handling in frame y could be omitted.

The above methods may be implemented in transmit control 311 to manipulate the uplink transmission for limiting the power consumption of the mobile communication device by taking more than one transmission time interval which, according to some implementations, may have the following advantages:

The user experience as well as 3GPP test cases may only be very limitedly affected by the method when assuming that a repetition period of suppressed UL TTI frames is bigger than 10 TTIs and therefore the loss in transmitted UL frames is very small, i.e. acceptable.

The method smoothly handles the transition between dropping uplink and not dropping uplink frames and thus is barely visible to the network or end user. No additional control by the network is required to handle this method. The method further allows a very quick reaction time on power consumption peaks. This is especially useful as a slow reaction time would result in longer uplink drop rates. The method allows to use embedded high speed mobile communication devices in host systems even though they are designed for lower power consumptions. The method does not influence the scheduler in the network side as the drop of uplink packets is a typical behavior of a mobile telecommunication system.

According to an implementation, controlling of the UE UL TX by the mobile communication device may be performed dependent on the power consumption directly by enabling/disabling UL TX and by taking more than 1 TTI into consideration According to a further implementation of the method in the Environmental Conditions Dependent UL TX Control, the transmission control 311 enables manipulating the UL transmission in order to limit the power consumption of the UE by taking more than 1 TTI into consideration is described by use of a flow charts shown in FIGS. 6 and 9. It is based on the following concepts:

The embedded mobile communication system forming an embodiment of the mobile communication device knows the dependency between transmission power and power consumption for all data rates. The embedded mobile communication system may determine the available energy for the next N TTIs. This may include the determination of the stored energy in the energy storage in case an energy storage is part of the embedded mobile communication system, and/or the consideration that all known limitations of the system affecting the power consumption, in particular that an average and peak current limitation and an thermal dissipation limitation are kept.

The embedded mobile communication system may calculate and estimate the expected energy consumption of the next N TTIs by using its knowledge about the dependency between transmission power and power consumption for all data rates. The needed parameters like e.g. the scheduled transmission power and UL and DL data rates are therefore provided by the network interface 305 of the embedded mobile communication system on a per TTI basis. As enhancement to the basic method, the network interface 305 may optionally already provide the needed parameters for the TTI n+1 for the calculation cycle for TTI n. The energy consumption of the TTIs n+1 in case the network interface 305 does not provide the needed parameters for the calculation cycle for TTI n+1, n+2, . . . , n+N−1 is predicted based on the provided parameters and energy consumption of previous TTI or TTIs. This can be done by using a linear, a non-linear or a learning algorithm.

The embedded mobile communication system may control the UL transmission on the interface towards the network by enabling or disabling the UL transmission dependent on whether the expected energy consumption for the next TTI is higher than the available energy for the next TTI and in addition by taking the available energy for the next N TTIs and the expected power consumption for the next TTIs and optionally the TTIs where the UL transmission was disabled the last xmax times into consideration. However, the DL reception on the network interface in this TTI is not affected by this control mechanism. When determining whether it is advantageous to already disable the UL transmission in the TTI n when taking the next N TTIs into consideration e.g. the following rule could be applied:

In case the last disabled UL transmission would not be considered it may lead to the suppression of the same regular DL frame feedback if no UL has been sent which may be connected to the same HARQ instance (Hybrid Automatic Repeat Request) as the DL frame feedback which was already suppressed before. This behavior could cause a single HARQ instance to have a much higher loss then the other HARQ instances. This may be avoided if the last xmax disabled UL TTIs are considered in order to avoid the suppression of a DL frame feedback which is connected to the same HARQ instance as a DL frame feedback which was already suppressed before. Therefore an UL TTI is maybe suppressed earlier than needed when evaluating whether the expected energy consumption for this TTI is higher than the available energy for this TTI in order to avoid that following UL TTIs containing DL frame feedbacks for HARQ instances for which the DL frame feedback was already suppressed before are not suppressed again. This can also be done by varying the occurrence of a disabled UL transmission TTI in a way that the repetition rate slightly varies for each period y+1, y−1, y, . . . .

Towards the network, this approach may be associated with a similar behavior than the situation that the UE misses the UL grant sent by the network for a TTI and therefore schedules no transmission on the UL for this TTI. Therefore the network may be able to handle such situations. In case this happens more often or regularly, which would be in case the power consumption is constantly over the available power consumption limit as depicted in FIGS. 7 and 8, it may be assumed that the network would reduce network interface resources for this UE and thus reduce the scheduled data rates for this UE which is the preferred behavior.

The embedded mobile communication system may always use the delta between the available energy and the consumed energy in one TTI to charge the energy storage. In particular the capability of the energy storage is chosen such that the charged energy in x TTIs with UL TX disabled allows N-x TTIs with UL TX enabled. Note, that with this method during the normal transmission frames with UL TX enabled the correct UL transmit power may be used even when it exceeds the current limitations of the power supply.

According to a further or to an alternative embodiment, e.g. in the case of the LTE technology, the uplink frames not only contain the uplink user data but may also contain the uplink control data. This control data may mainly be used to give feedback on the received downlink data, wherein the feedback may be transmitted by the mobile communication device towards the communication network. In case the feedback information is not received by e.g. a remote network entity, the network may assume that the downlink data has not been received by the mobile communication device and thus may repeat the transmission of already transmitted transmission data. This founding may lead to the further optimization which may result in discarding the received data if the acknowledgement associated herewith will not be transmitted due to a reduction of the power consumption. For example, a data block received in frame y may be acknowledged in frame y+4. In the case the mobile communication device would know, e.g. from a prediction, already in frame y that the frame y+4 will not be transmitted as scheduled for transmission within the certain time interval during which the data reduction may be performed, then also the downlink data reception and handling in frame y could be omitted which additionally saves energy. By way of example, the interface IF2 shown in FIG. 3 may be extended to also allow the control of enabling and/or disabling the reception of the downlink data frames. It shall be noted that this method may also be used when N is greater than 4.

The above described implementations may have the advantage that a single HARQ instance which has a much higher loss than other HARQ instances may be avoided. Furthermore, an additional power or energy may be saved.

As aforementioned, the methods depicted in FIGS. 6 and 9 may be performed by the transmission control 311, which may be implemented to form an environmental conditions dependent uplink transmission control unit manipulating the power consumption of the mobile communication device by manipulating the transmission, i.e. the uplink transmission, of the mobile communication device, wherein one transmission time interval may be taken into account. According to an implementation, the uplink transmission may also be manipulated in order to limit the power consumption of the mobile communication device by taking more than one transmission time interval into consideration which may also be implemented in the environmental conditions dependent uplink transmission control unit forming an embodiment of the transmission control 311 of FIG. 3.

The present invention may be embodied in a method to limit a power or current consumption of an embedded mobile communication system, in particular of an LTE or WCDMA UE, by controlling or manipulating the UL transmission on an interface towards the corresponding communications network.

In another embodiment the controlling or manipulating is performed in dependence of the UE power consumption (e.g. the power actually being consumed, to be consumed, or forecasted to be consumed) and the available power (e.g. dependent of capabilities of the power supply (e.g. the battery) and/or of a further energy storage (e.g. a capacitor circuit and/or a further battery).

In a further embodiment the UL transmission is controlled to ensure that one or a plurality of defined (environmental) conditions/limits (e.g. a current/power consumption limit, an average current/power consumption limit, a peak current/power consumption limit) is fulfilled.

In yet another embodiment the UL transmission is controlled by reducing the amount of UL data (wherein the term reducing covers reduction to any number, e.g. to zero data) within certain transmission intervals (in the following also being referred to as inserting a transmission gap).

In yet a further embodiment the reduction is performed by suppressing a transmission of (parts of the) data to be transmitted within the transmission interval and delaying the transmission of the data accordingly.

In another embodiment the transmission of one of a plurality of channels (e.g. a user data channel) is suppressed while a transmission of data over the other channels (e.g. a control channel) is not altered.

In an additional embodiment one or a plurality of transmission gaps are inserted within the UL data signal, depending on a UE power consumption (e.g. being measured, calculated, estimated or forecasted) and at least one of: a power limit, an average power limit, a power limit an average power limit, a temperature limit, a UE capability limit related to power supply, a heat dissipation limit, a temperature dissipation limit, and a UE power supply capability limit.

In an added embodiment an energy storage (e.g. battery or capacitor) is provided to store energy from the (main) power supply of the UE during transmission gaps, and to provide to the UE (e.g. the network interface) additional power in addition to the power from the power supply in other transmission periods. This can e.g. be advantageously applied in situations of a current limitation, wherein the current limit for one TTI is below the (maximum) needed current in one TTI.

In a further embodiment one or a plurality of UL transmission gaps are inserted to ensure both an average current limitation and a peak current limitation.

In yet another embodiment a power management distribution of the current to be consumed to the different building blocks of the embedded system is performed.

A further embodiment comprises a power supply capability detection is performed to detect capabilities of the host power supply (e.g. comprising a static part being derived from known system parameters or being detected in advance, e.g. at the start-up phase, and/or comprising a dynamic part of the host power supply capabilities which may vary over the time and is determined during UE operation (e.g. continuously or repeatedly to be measured, detected or estimated).

In another embodiment an energy consumption forecast calculation is performed to determine an expected energy (or power) consumption of the embedded system for the transmission interval (s) and optionally estimates a forecast of the expected energy consumption for the following transmission interval(s) from parameters provided from the network (by the network interface), e.g. the used bandwidth, the scheduled UL transmission power and the scheduled UL and DL data rates.

In yet another embodiment an environmental conditions dependent UL transmission manipulation is performed by suppressing (or reducing) within a transmission interval dependent on the available energy for the next transmission interval (s) and on the expected energy consumption for the next transmission interval (s) a data transmission, to keep the current and/or thermal dissipation limitations.

In a further embodiment the transmission interval is an LTE uplink transmission time interval (TTI), wherein the reduction of data is realized by reducing the resource blocks associated to this TTI.

In an additional embodiment wherein the reduction is achieved by at least one of one of: manipulating the received UL resource allocation transmitted by the network before delivery to Layer 2 (MAC layer), disabling the reception of the UL resource allocation transmitted by the network on the physical layer (PHY), and cancellation of the UL transmission on the PHY.

The present invention may be embodied in a user equipment comprising a power supply, a processing unit, a network interface, and a transmission manipulation circuit that is adapted to suppress (or reduce) a data transmission in a forthcoming transmission interval dependent on the available energy for one or a plurality of forthcoming transmission intervals and on an expected energy consumption for these transmission intervals.

The particular combinations of elements and features in the above detailed embodiments are exemplary only; the interchanging and substitution of these embodiments with other embodiments disclosed herein are also expressly contemplated. As those skilled in the art will recognize, variations, modifications, and other implementations of what is described herein can occur to those of ordinary skill in the art without departing from the spirit and the scope of the invention as claimed. Accordingly, the foregoing description is by way of example only and is not intended as limiting. The invention's scope is defined in the following claims and the equivalents thereto. Furthermore, reference signs used in the description and claims do not limit the scope of the invention as claimed.

The invention claimed is:

1. A method for managing a power consumption of a mobile communication device capable of transmitting transmission data at a transmission data rate towards a communication network, the method comprising:
   providing energy to the mobile communication device via a power supply interface, wherein the power supply interface is subject to power restrictions or power limitations associated with the respectively used interface technology, wherein said mobile communication device comprises said power supply interface;
   reducing the transmission data rate within a certain transmission time interval (TTI) to reduce an energy consumption of the mobile communication device by a certain amount of energy;
   storing the certain amount of energy in an energy storage; and providing at least a part of the stored certain amount of energy in addition to providing power supply energy to the mobile communication device within at least one other TTI to assure a scheduled transmission data rate during said at least one other TTI, regardless of whether a current power limitation is exceeded for the at least one other TTI;

wherein the certain TTI and the at least one other TTI are repeated to form a pattern in time.

2. The method according to claim 1, wherein reducing the transmission data rate comprises reducing the transmission data rate within the certain TTI responsive to at least one of:
an energy available for at least one TTI and an expected energy consumption during the at least one TTI;
environmental conditions, including an environmental temperature;
a heat or temperature dissipation limit;
a power limit;
an average power limit;
a temperature limit; and
a capability limit of a power supply energizing the mobile communication device.

3. The method according to claim 1, further comprising determining the certain TTI responsive to at least one of:
an energy available for at least one TTI and an expected energy consumption during the at least one TTI;
environmental conditions, including an environmental temperature;
a heat dissipation limit;
a power limit;
an average power limit;
a temperature limit; and
a capability limit of a power supply energizing the mobile communication device.

4. The method according to claim 1, wherein the certain amount of energy corresponds to a difference between energy available for the certain TTI and energy consumed within the certain TTI.

5. The method according to claim 1, wherein reducing the transmission data rate comprises at least partly disabling a transmission of the transmission data within the certain TTI if a transmission of the transmission data is expected to contribute to an energy consumption exceeding the available energy for the certain TTI.

6. The method according to claim 1, further comprising determining an expected energy consumption during at least one TTI, including the certain TTI, based on at least one of:
a rate dependent relationship between a transmission power and a power consumption; and
at least one network parameter comprising at least one of a transmission bandwidth, a scheduled transmission power, a scheduled transmission data rate, and a reception data rate.

7. The method according to claim 6, wherein reducing the transmission data rate comprises reducing the transmission data rate based on the expected energy consumption.

8. The method according to claim 1, wherein the transmission data comprises user data and control data respectively associated with a user data rate and a control data rate, and wherein reducing the transmission data rate comprises at least one of:
reducing the user data rate by suppressing the user data, and transmitting the control data within the certain TTI; and
reducing the user data rate and the control data rate by suppressing the user data and the control data.

9. The method according to claim 1, further comprising transmitting transmission data scheduled for transmission within the certain time interval during or within another time interval to reduce the transmission data rate within the certain TTI.

10. The method according to claim 1, wherein reducing the transmission data rate comprises reducing the transmission data rate by at least one of:
manipulating an uplink resource allocation received over the communication network prior to delivering the uplink resource allocation to a medium access control layer of the mobile communication device;
disabling the reception of the uplink resource allocation; and
prohibiting a transmission of the transmission data.

11. The method according to claim 1, wherein the certain transmission time interval is associated with a certain transmission time index of a transmission period, wherein the method further comprises reducing a transmission data rate during another (TTI) associated with another transmission time index of another transmission period, and wherein the other transmission time index differs from the certain transmission time index to avoid reducing transmission data rates in corresponding TTIs of different transmission periods.

12. The method according to claim 1, further comprising discarding received data if a reception acknowledgement indicating a reception of the received data is scheduled to be transmitted towards the communication network within the certain TTI.

13. A mobile communication device for transmitting transmission data towards a communication network, the mobile communication device comprising:
a power supply interface configured to provide energy to the mobile communication device, wherein the power supply interface is subject to power restrictions or power limitations associated with the respectively used interface technology;
a power management unit configured to interface with the power supply interface;
a network interface configured to reduce a transmission data rate within a certain transmission time interval (TTI) to reduce an energy consumption of the mobile communication device by a certain amount of energy; and
an energy storage configured to store the certain amount of energy,
wherein the power supply interface is further configured to provide at least a part of the stored certain amount of energy in addition to providing power supply energy to the mobile communication device within at least one other TTI to assure a scheduled transmission data rate during said at least one other TTI, regardless of whether a current power limitation is exceeded for the at least one other TTI, and
wherein the certain TTI and the at least one other TTI are repeated to form a pattern in time.

14. The mobile communication device according to claim 13, further comprising a transmission control configured to:
determine the certain TTI responsive to an energy available for at least one TTI and an expected energy consumption during the at least one TTI and provide information indicating the certain TTI to the network interface.

15. The mobile communication device according to claim 14, wherein the transmission control is configured to transmit the transmission data according to at least one of a Universal Mobile Telecommunication System (UMTS), Global System for Mobile Communications (GSM), Long Term Evolution (LTE), and Code Division Multiple Access 2000 (CDMA2000).

16. A computer program stored in a non-transitory computer readable medium, the computer program comprising program code which when executed by a computer causes the computer to implement a method for managing a power consumption of a mobile communication device capable of transmitting transmission data at a transmission data rate towards a communication network by:
   interfacing with a power supply interface, wherein the power supply interface is configured to provide energy to the mobile communication device and subject to power restrictions or power limitations associated with the respectively used interface technology, wherein said mobile communication device comprises said power supply interface;
   reducing the transmission data rate within a certain transmission time interval (TTI) to reduce an energy consumption of the mobile communication device by a certain amount of energy;
   storing the certain amount of energy; and
   providing at least a part of the stored certain amount of energy in addition to providing power supply energy to the mobile communication device within at least one other TTI to assure a scheduled transmission data rate during said at least one other TTI, regardless of whether a current power limitation is exceeded for the at least one other TTI;
   wherein the certain TTI and the at least one other TTI are repeated to form a pattern in time.

17. A method for managing a power consumption of a mobile communication device capable of transmitting transmission data at a transmission data rate towards a communication network, the method comprising:
   providing energy to the mobile communication device via a power supply interface, wherein said mobile communication device comprises said power supply interface, and wherein the power supply interface is subject to power restrictions or power limitations associated with the respectively used interface technology;
   reducing the transmission data rate within a certain transmission time interval (TTI) to reduce an energy consumption of the mobile communication device by a certain amount of energy, wherein the certain transmission time interval comprises a Long-Term Evolution (LTE) uplink TTI, and wherein reducing the transmission data rate is realized by reducing the resource blocks associated with the LTE uplink TTI;
   storing the certain amount of energy in an energy storage; and
   providing at least a part of the stored certain amount of energy in addition to providing power supply energy to the mobile communication device within at least one other TTI to assure a scheduled transmission data rate during said at least one other TTI, regardless of whether a current power limitation is exceeded for the at least one other TTI,
   wherein the certain TTI and the at least one other TTI are repeated to form a pattern in time.

18. A mobile communication device for transmitting transmission data towards a communication network, the mobile communication device comprising:
   a power supply interface configured to provide energy to the mobile communication device, wherein the power supply interface is subject to power restrictions or power limitations associated with the respectively used interface technology;
   a power management unit configured to interface with the power supply interface;
   a network interface configured to reduce a transmission data rate within a certain transmission time interval (TTI) to reduce an energy consumption of the mobile communication device by a certain amount of energy, wherein the certain transmission time interval comprises a Long-Term Evolution (LTE) uplink TTI, and wherein the network interface is further configured to reduce a transmission data rate by reducing the resource blocks associated with the LTE uplink TTI; and
   an energy storage configured to store the certain amount of energy,
   wherein the power supply interface is further configured to provide at least a part of the stored certain amount of energy in addition to providing power supply energy to the mobile communication device within at least one other TTI to assure a scheduled transmission data rate during said at least one other TTI, regardless of whether a current power limitation is exceeded for the at least one other TTI, and
   wherein the certain TTI and the at least one other TTI are repeated to form a pattern in time.

19. The method according to claim 1, wherein the scheduled transmission data rate is higher than the reduced transmission data rate.

* * * * *